United States Patent
Lindrose et al.

[19]

[11] Patent Number: 6,113,277
[45] Date of Patent: Sep. 5, 2000

[54] ACTUATOR PIVOT BEARING WITH REDUCED HYSTERESIS

[75] Inventors: Albert M. Lindrose, Boulder; Frederick Mark Stefansky, Longmont, both of Colo.

[73] Assignee: Seagate Technology LLC, Scotts Valley, Calif.

[21] Appl. No.: 09/126,536

[22] Filed: Jul. 30, 1998

Related U.S. Application Data

[60] Provisional application No. 60/054,312, Jul. 31, 1997.

[51] Int. Cl.$^7$ .............................. F16C 33/60; F16C 33/58
[52] U.S. Cl. .......................... 384/513; 384/499; 384/514
[58] Field of Search ................................... 384/490, 499, 384/504, 510, 513, 514, 516

[56] References Cited

U.S. PATENT DOCUMENTS

| | | | |
|---|---|---|---|
| 2,588,459 | 3/1952 | Annen | 384/513 X |
| 4,548,518 | 10/1985 | Ravinale et al. | 384/490 |
| 4,993,851 | 2/1991 | Nakanishi | 384/513 X |
| 5,768,060 | 6/1998 | Albrecht et al. | 384/516 X |

OTHER PUBLICATIONS

R.C. Drutowski, "Energy Losses of Balls Rolling on Plates", Journal of Basic Engineering, Jun., 1959, Research Laboratories, General Motors Corporation, Detroit, Mich.

D. Tabor, "The Mechanism of "Free" Rolling Friction", Journal of the American Society of Lubrication Engineers, Nov.–Dec. 1956, Department of Physical Chemistry, University of Cambridge, Cambridge, England.

*Primary Examiner*—Thomas R. Hannon
*Attorney, Agent, or Firm*—Jonathan E. Olson; Shawn B. Dempster; Edward B. Heller

[57] ABSTRACT

An improved pivot mechanism for an actuator assembly of a disc drive having an E-block that supports plurality of read/write heads in data reading and writing relationship to an array of spinning data discs. The pivot mechanism has a bearing cartridge that supports the E-block and which pivots about a pivot shaft which supports a pair of ball bearings of the bearing cartridge. Each of the ball bearings contains only three balls that are evenly distributed circumferentially about the pivot shaft. Contact surfaces of the bearing outer race and inner race provide single-point contact between the races and the balls.

20 Claims, 8 Drawing Sheets

Complex bearing stiffness components vs angular actuator displacement

ACTUATOR PIVOT BEARING WITH REDUCED HYSTERESIS

RELATED APPLICATIONS

This application claims the benefit of U.S. Provisional Application Ser. No. 60/054,312 entitled THREE-BALL ACTUATOR PIVOT BEARING WITH REDUCED HYSTERESIS, filed Jul. 31, 1997.

FIELD OF THE INVENTION

This invention relates generally to the field of disc drive data storage devices, and more particularly, but not by way of limitation, to an improved pivot bearing with reduced hysteresis for pivotally supporting the actuator of the disc drive storage device.

BACKGROUND

Disc drives of the type known as "Winchester" disc drives are well known in the industry. Such disc drives record digital data on a plurality of circular, concentric data tracks on the surfaces of one or more rigid discs. The discs are typically mounted for rotation on the hub of a spindle motor. In disc drives of the current generation, the spindle motor rotates the discs at speeds of up to 10,000 RPM.

Data are recorded to and retrieved from the discs by an array of vertically aligned read/write head assemblies which are controllably moved from track to track by an actuator assembly. The read/write head assemblies typically have an electromagnetic transducer carried on an air bearing slider. This slider acts in a cooperative hydrodynamic relationship with a thin layer of air dragged along by the spinning discs to fly the read/write head assembly in a closely spaced relationship to the disc surface. In order to maintain the proper flying relationship between the read/write head assemblies and the discs, the read/write head assemblies are attached to and supported by head suspensions.

The actuator assembly used to move the read/write heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is pivotally mounted to the pivot shaft and supports a coil which is suspended in a magnetic field of an array of permanent magnets. Opposite the coil, the actuator housing also typically includes a plurality of vertically aligned, radially extending actuator head mounting arms, to which the head suspensions are mounted. When controlled direct current is applied to the coil, an electromagnetic field is formed which interacts with the magnetic field of the permanent magnets to rotate the actuator housing in accordance with the well-known Lorentz relationship. As the actuator housing rotates, the read/write heads are moved radially across the data tracks.

Control of the movement of the read/write heads from track to track on the disc surfaces is commonly accomplished through the use of a closed-loop servo system. Such servo systems typically make use of servo information recorded on the disc surfaces at the time of manufacture to obtain general information defining the specific track number and the sector position of the disc relative to the read/write head. When an access command is sent to the disc drive, a comparison is internally made between the current position of the read/write heads relative to the disc and the location at which the desired data transfer is to take place. If the read/write heads are currently positioned over the desired tracks, the disc drive simply waits for the correct circumferential location to rotate under the read/write heads, and begins the requested data transfer. If, however, the data transfer is to take place at a location other than the current position of the actuator, the servo logic determines both the distance and direction in which the actuator must move in order to bring the read/write heads to the target track. Based on this determination, the servo logic applies controlled direct current to the coil of the actuator voice coil motor (VCM), which causes the actuator to move from the current track location to the target track.

During such seek operations, the servo logic monitors the dynamic position of the actuator by reading the prerecorded servo data from the disc surfaces during the seek, and controls the current applied to the VCM in a manner to bring the read/write heads to rest at the target track.

A second function of the servo system is to maintain the read/write heads over the centerline of the target track, so that data transfers can be accomplished without inadvertently accessing adjacent tracks. This "track following" function is accomplished by constantly monitoring a position error signal (PES) which is proportional to the relationship of the read/write heads to the track centerline. That is, when the read/write heads are perfectly centered on the data track, the PES is zero, and no current is applied to the actuator VCM. Any tendency of the read/write heads to move away from the track centerline results in the generation of a PES with a polarity reflective of the direction in which the read/write head is displaced from the track centerline. The PES is then used by the servo system logic to generate a correction signal to move the read/write heads back toward the track centerline until such time as the PES is again zero, indicating that the read/write heads are again properly aligned with the data tracks.

Disc drives of the current generation typically provide maximum track densities of the order of ten thousand to twenty thousand tracks per inch measured radially across the disc, and future generations of disc drives are expected to continually increase the density. In current disc drives, the magnitude of the allowable mispositioning envelope between read/write head position and track centerline is on the order of approximately 10 microinches (0.000010 inches) peak to peak. With future track densities ever increasing, the servo system of the disc drive must be capable of controlling the position of the actuator with ever-increasing accuracy, and the allowable mispositioning envelope must be proportionally reduced.

Typically, the actuator is supported about the pivot shaft by a number of ball bearings having an outer race that rolls smoothly about an inner race due to a plurality of balls interposed therebetween. A geometrical analysis of current disc drives reveals that a tracking envelope of approximately 10 microinches at the read/write head and disc interface imparts a motion to a ball within the ball bearing of only a few tenths of a microinch at the contact points between the balls and the bearing races. Since it is common practice to preload the ball bearings in order to provide necessary stiffness of the actuator pivot, ball motions of this order are much smaller in scale than the size of the localized elastic deformations at the ball/race interface caused by the preload force. Typically, the elliptical contact area between the balls and the race is on the order of several hundred microinches. The end result is that on the microinch and sub-microinch scale, i.e., for extremely small peak-to-peak actuator motions, the balls do not rotate during a servo track following mode. Instead, the balls simply have a shifting a stress distribution, that is, the flattened, elliptical shape shifts back and forth.

This elastic deformation behavior exhibits itself in the servo system as a relatively stiff torsional spring force coupled to the actuator inertia. Force on the ball and displacement are essentially in phase during cyclical motion of the actuator. If, however, the peak-to-peak actuator motions get slightly larger, then the balls will tend to begin actually rolling back and forth. With such a tendency to roll, there is a reduction of the contribution of ball deformation to the apparent stiffness. At the same time, however, race deformations ahead of the rolling elements begin to participate in the dynamics of the actuator. The elastic strain energy required for the balls to roll is only partly recovered from the rebounding race material behind the rolling element, and the rest is dissipated as heat. The result is that ball displacement response becomes out of phase with the force trying to move the ball. This effect is referred to as hysteresis, and depends, to a large extent, on the damping properties of the specific materials of the bearing components.

In addition to hysteresis, the ball/race interface of a ball bearing experiences two other kinds of rolling resistance: 1) spinning friction, related to the fact that the contact area on the ball tends to rotate relative to the contact area on the bearing race at the start of motion (essentially a contact area torsional friction effect); and 2) frictional resistance, related to the fact that distances from the rotary axis of the ball to individual points in the contact area vary, as do the associated peripheral speeds, causing the middle section of the ball contact area to slide opposite to the direction of rolling while the outer sections slide in the rolling direction.

Generally, all of the components offering resistance to movement of the actuator are combined under the category of rolling contact friction. One of skill in the art will realize that the phenomenon is extremely complex and difficult to analyze. What is known, however, is that hysteresis and spinning friction are dependent on individual ball load, Q, to the four-thirds power ($Q^{4/3}$). Sliding friction is dependent on individual ball load, Q, to the five-thirds power ($Q^{5/3}$) (see Dutrowski, R., *Energy Losses of Balls Rolling on Plates* (ASME Transactions, Series D, J. Basic Eng. 81 (1959), 2, 233–238 and Tabor, D., *The Mechanism of Free Rolling Friction* (Lubrication Engineering, November–December (1956), 379–386). The obvious conclusion is that, if one wishes to reduce rolling contact frictional losses, the key is to reduce Q. Reducing the magnitude of Q through preload reduction must be done judiciously, however, since overall bearing axial and radial rigidity is also dependent on the one-third power of Q ($Q^{1/3}$).

With the small motions of disc drive actuators typical to servo track following, experiments have shown that hysteresis is the major contributor to performance. Mathematically, hysteresis can be characterized as a complex stiffness that has real and imaginary parts. Note that hysteresis is different from viscous damping inasmuch as hysteresis does not depend on the frequency of oscillation of the system. In the case of ball bearings, hysteresis is rather totally dependent on the peak-to-peak magnitude of the displacement. It is this dependency on magnitude that makes hysteresis a particularly difficult problem for servo systems engaged in track following mode activity.

In efforts to eliminate or minimize the effects of ball bearing hysteresis in disc drive actuators, other types of pivot mechanisms have been proposed for disc drive actuators. Such proposed alternatives include fluid bushings, jewel bearings, spring-loaded line-contact pivots, knife edges, etc. Ball bearings incorporating ceramic balls and races have also been explored. Although hysteresis reduction has been achieved in some of these alternative pivot mechanisms, typically the gains in hysteresis reduction have been accomplished by a significant loss of simplicity in the actuator design, a loss of necessary pivot rigidity or some other undesirable characteristic.

Therefore, a need clearly exists for a pivot mechanism for the actuator in a disc drive that provides lowered hysteresis while still maintaining other desirable characteristics.

SUMMARY OF THE INVENTION

The present invention is a pivot mechanism for an actuator in a disc drive incorporating novel three-ball ball bearing structures. The inclusion of the novel three-ball ball bearing structures allows for a reduction in the preload force necessary to provide rigidity to the pivot mechanism, along with attendant reduction in individual ball load, and therefore, reduction in the hysteresis of the pivot mechanism. The three-ball ball bearing structures also provide a pivot mechanism which is inherently stable in the plane of the ball bearings, and thus in the plane of rotation of the actuator.

The features, benefits and advantages of the invention can best be understood by a review of the following detailed description of the invention, when read in conjunction with an examination of the accompanying drawings.

DETAILED DESCRIPTION OF THE INVENTION

Figure 1:
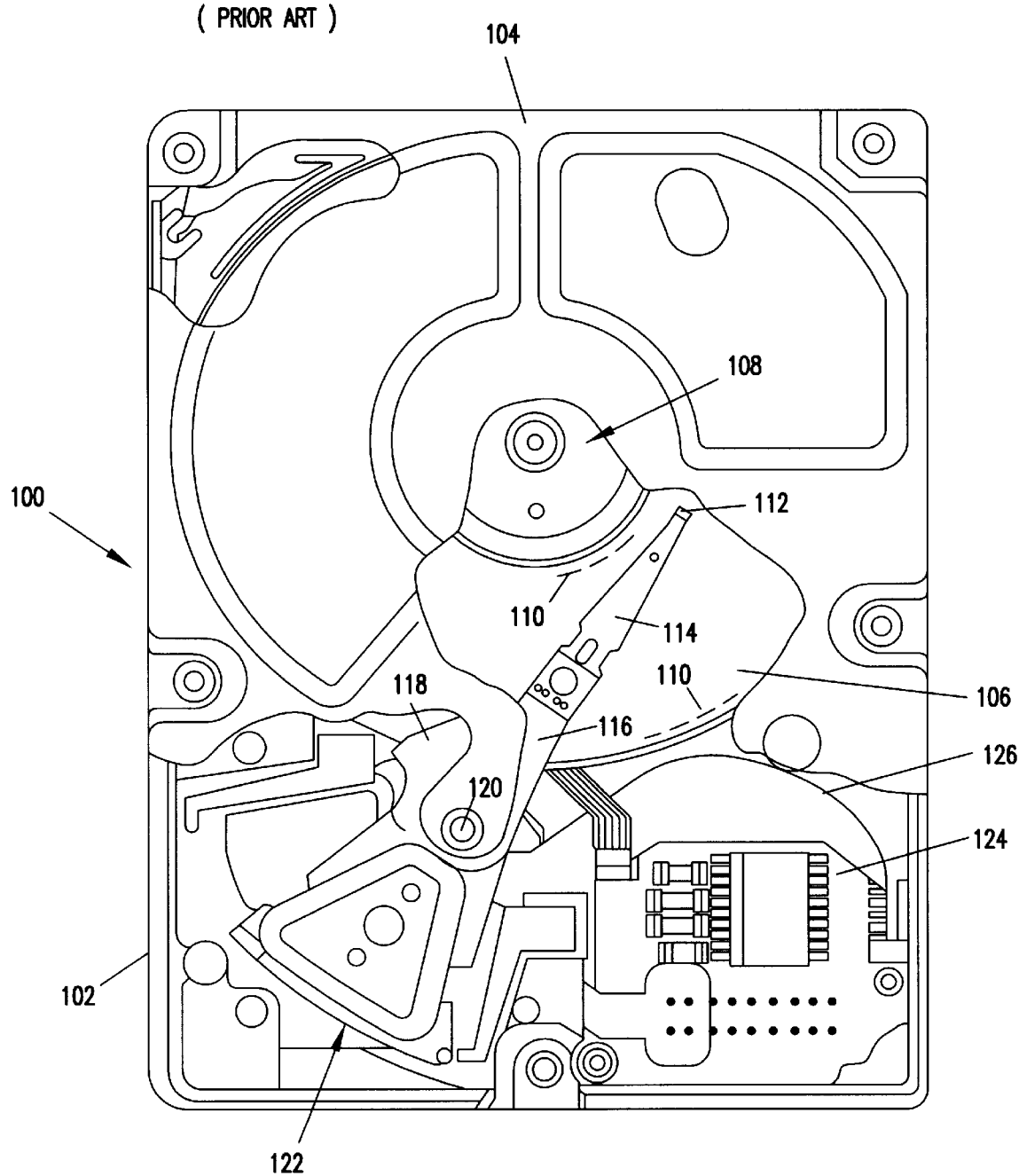
FIG. 1 is a plan view of a prior art disc drive in which the present invention is particularly useful.

Turning now to the drawings and specifically to FIG. 1, shown is a typical disc drive 100 in which the present invention is particularly useful. The disc drive 100 includes a base deck 102 to which all other components are directly or indirectly mounted and a top cover 104 (shown in partial cutaway) which, together with the base deck 102, forms a disc drive housing enclosing delicate internal components and isolating these components from external contaminants.

The disc drive 100 includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned read/write heads 112 (one shown). The read/write heads 112 are supported by head suspensions, or flexures 114, which are attached to actuator head mounting arms 116. The actuator head mounting arms 116 are integral to an actuator having an E-block 118 which is mounted via an array of ball bearing assemblies (designated below) for rotation about a pivot shaft 120.

Power to rotate the E-block 118 about the pivot shaft 120 is provided by a voice coil motor (VCM) shown generally at 122. Electronic circuitry 124 (partially shown) to control all aspects of the operation of the disc drive 100 is provided, with control signals to drive the VCM 122 as well as data signals to and from the read/write heads 112 carried via a flexible printed circuit cable (PCC) 126.

A pair of precision ball bearing assemblies (denoted separately below) facilitate pivoting of the E-block 118 about the pivot shaft 120. In prior art pivot mechanisms, these ball bearing assemblies are interposed between the pivot shaft 120 and the E-block 118 within a bore formed by the E-block 118. Most commonly, the bearing assemblies are preassembled into an assembly, such as the bearing cartridge 134 shown in FIG. 2.

Figure 2:
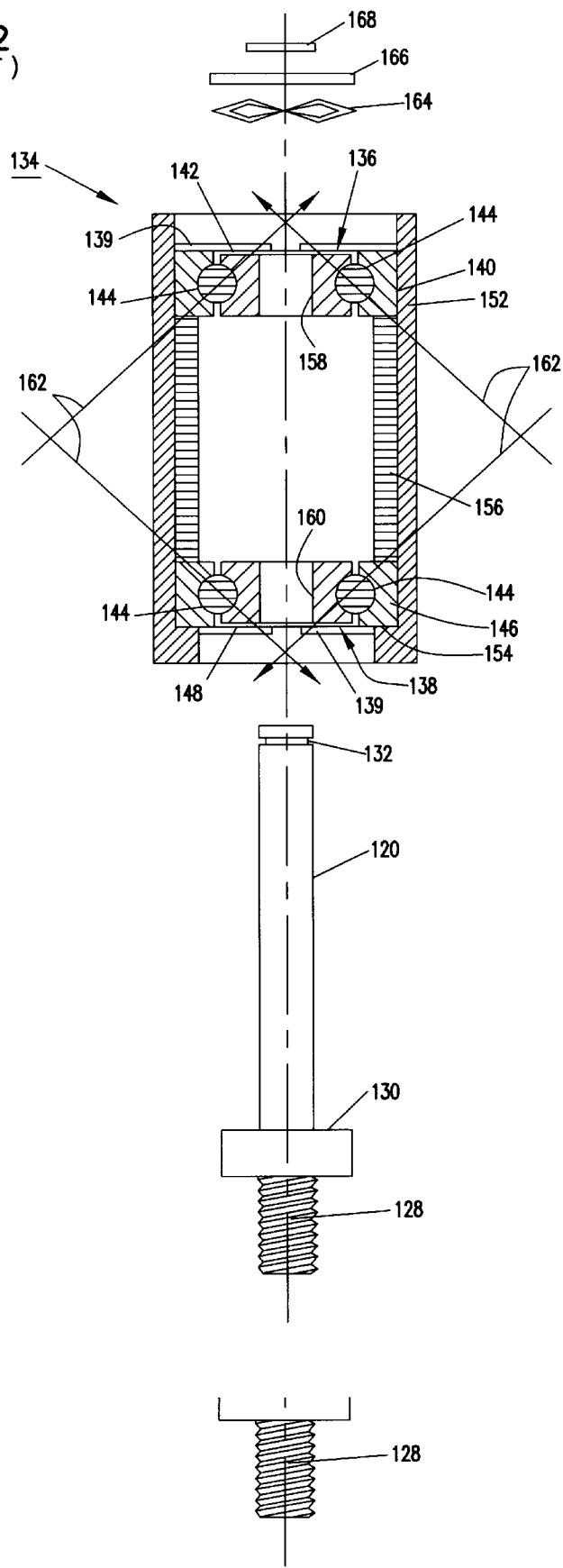
FIG. 2 is a partial sectional elevation view of a prior art actuator pivot mechanism preloaded in a "diamond" arrangement.

FIG. 2 shows the pivot shaft 120 which has a threaded portion 128 intended for engagement with a cooperative threaded opening in the base deck 102 to support the pivot mechanism. The pivot shaft 120 also includes a flange member 130 and an annular groove 132, the functions of which will be discussed below.

The bearing cartridge 134 incorporates upper and lower ball bearings 136, 138. The upper, or otherwise referred to as the first ball bearing 136 has an outer race 140, an inner race 142, and a plurality of balls 144 interposed therebetween. Similarly, the lower, or otherwise referred to as the second ball bearing 138 has an outer race 146, an inner race 148, and a plurality of balls 144 interposed therebetween. As will be understood by one of skill in the art, both the upper and lower bearing assemblies 136, 138 would also include some sort of sealing members 139 to prevent migration of the internal lubricants out of the bearing assemblies and migration of contaminants into the ball bearings 136, 138.

The bearing cartridge 134 also includes a cylindrical sleeve 152 which has a step 154 against which the second outer race 146 is brought to bear. The bearing cartridge 134 may also include a cylindrical sleeve 156 which engages an inner diameter of the sleeve 152 to maintain the desired axial spacing between the outer races 140, 146. The first and second inner races 142, 148 form central bores 158, 160 (respectively) dimensioned to closely cooperate with a diameter of the pivot shaft 120.

As is known to those of skill in the art, it is common practice in the industry to apply a preload force to the ball bearings 136, 138 in order to establish an axial and radial rigidity sufficient to provide the necessary structural integrity to the E-block 118 in relationship to the spinning discs 106. The magnitude and direction of this preload force depends on the attachment of the outer races 140, 146 relative to the inner races 142, 148.

For example, if the inner races 142, 148 are drawn together relative to fixed outer races 140, 146, a "diamond" preload arrangement is established. In this arrangement the preload acts along the force lines designated by reference arrows 162, which together form a diamond shape. The following provides an exemplary assembly sequence for providing a "diamond" preload arrangement.

First, the second outer race 146 is pressed into the sleeve 152 until it comes to rest against the step 154. The sleeve 156 is then inserted into the sleeve 152 until it abuttingly engages the second outer race 146. The first outer race 140 is pressed into the sleeve 152 into abutting engagement with the sleeve 156.

The pivot shaft 120 is receivingly disposed in the bores 158, 160 of the inner races 142, 148 so that the flange member 130 pressingly engages against the second inner race 148. The bearing preload is accomplished by drawing the inner races 142, 148 toward each other before attachment thereof to the pivot shaft 120. The magnitude of the preload force is proportional to the amount of force employed to draw the inner races 142, 148 together prior to joining them to the shaft 120.

FIG. 2 illustrates a typical manner of retaining the inner races 142, 148 together in a preloaded state. After the pivot shaft 120 has been inserted through the inner races 142, 148, a Belleville spring 164 and a flat washer 166 are placed over a distal end of the pivot shaft 120, and a clip 168 lockingly engages the groove 132. Thus, the amount of preload force is a function of the length of the inner sleeve 156 relative to the operative length of the pivot shaft 120 and the stiffness of the Belleville spring 164. After the preload is applied the inner races 142, 148 may be attached, such as by the use of adhesive, to medial portions of the pivot shaft 120.

Figure 3:
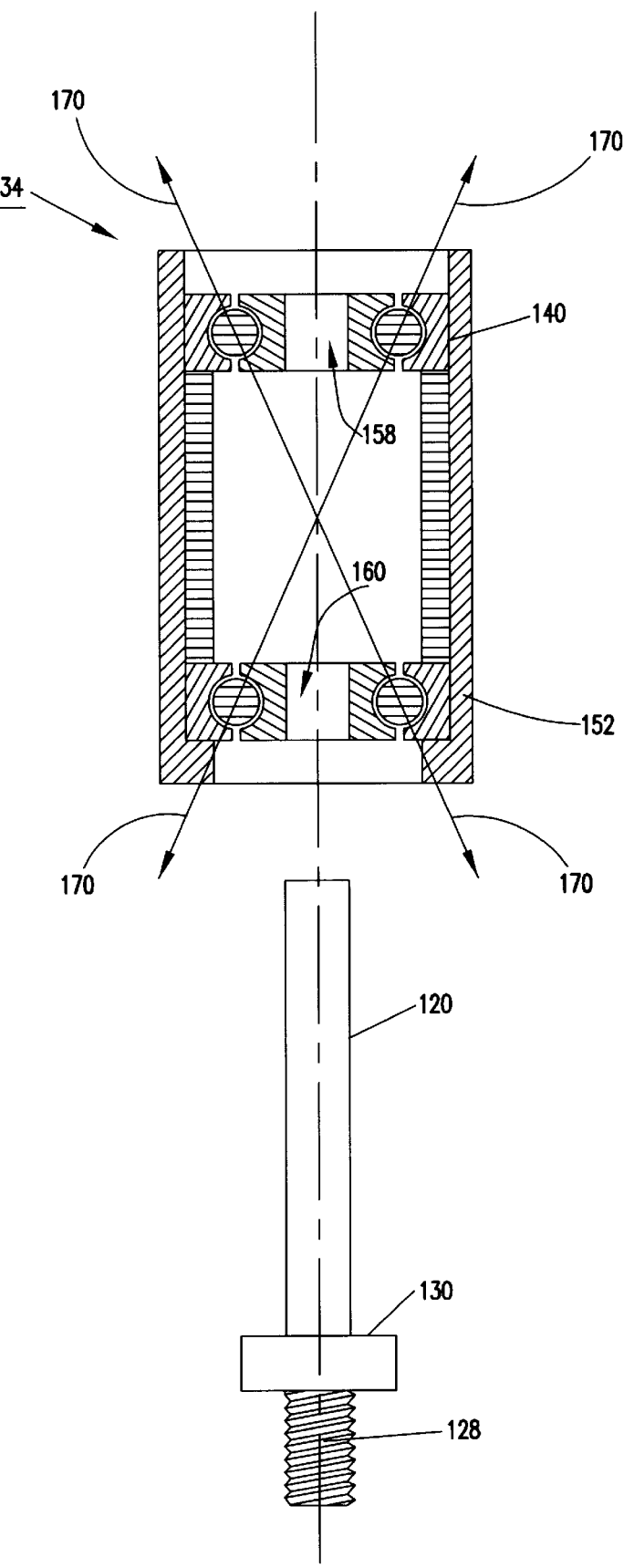
FIG. 3 is a sectional elevation view of a prior art actuator pivot mechanism preloaded in an "X" arrangement.

Alternatively, if the outer races 140, 146 are drawn together relative to fixed inner races 142, 148 an "X" preload arrangement is established. In this arrangement, as shown in FIG. 3, the preload force acts along the force lines designated by reference arrows 170, which together form an "X" shape. Such an arrangement is provided if, for example, the inner races 142, 148 are first attached to medial portions of the pivot shaft 120 and then the outer races 140, 146 are drawn together and attached to the sleeve 152.

Whatever preload method is used, the bearing cartridge 134 is a self-contained component that can be attached to the E-block 118 in support thereof. The pivot shaft 120 may be assembled to the bearing cartridge 134 and attached to the base deck 102, or it may be formed as a portion of the base deck 102 and attached to the bearing cartridge 134.

Figure 4:
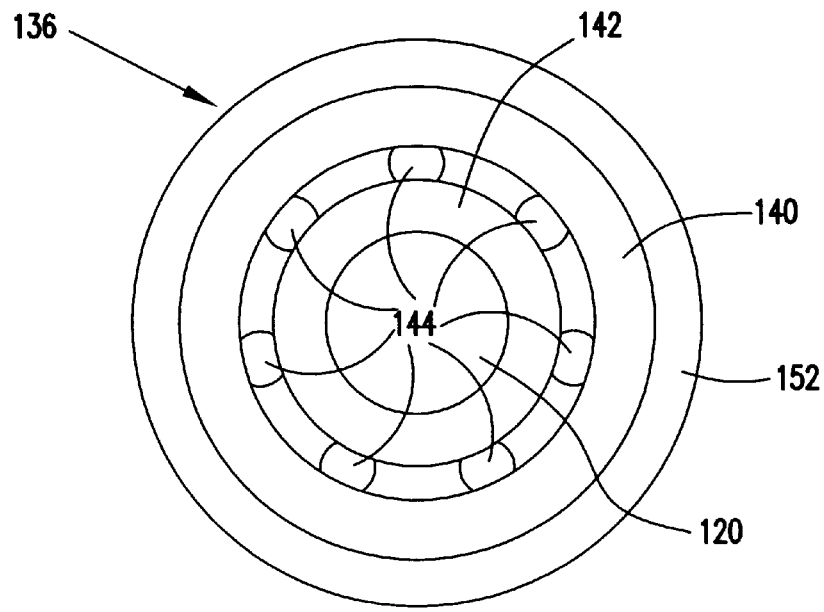
FIG. 4 is a plan view of a bearing in a prior art pivot mechanism.

In prior art pivot mechanisms the ball bearings 136, 138 typically include either seven or thirteen balls. FIG. 4, for example, illustrates a ball bearing assembly 136 having seven balls 144. Because of inherent part-to-part variation in the diameter of the balls 144, and because it is desirable that all of the balls 144 transmit at least part of the overall bearing load, the amount of preload force necessary to ensure ball/race contact at all the balls 144 is dependent on the difference in size between the largest ball 144 and the smallest ball 144. Typically the amount of preload force necessary to engage all the balls 144 in a bearing assembly 136 is relatively large, about 400 gm. It will be noted that this magnitude of preload force, necessary to bring all balls 144 into load bearing engagement, is greater than the force necessary to provide adequate stiffness to the pivot mechanism in the absence of ball-to-ball size variation.

One solution that would allow the use of a reduced preload force would be to decrease the part-to-part variation in the balls. However, decreasing the tolerance variation of the balls would be economically constraining, given the state of the art in manufacturing. That is, either increasing the manufacturing precision, or adequate sorting of balls made to existing manufacturing capability would result in finished ball bearing assemblies which would, of necessity, be prohibitively more expensive than units in use at this time, and disc drive manufacturers are severely limited by market influences from adding additional costs to the disc drive. Indeed, historically, the cost per unit of storage has been drastically decreasing, while the overall storage capacity of disc drives has been correspondingly increasing. Therefore, simply improving the manufacturing precision of existing ball bearing assemblies is not an economical possibility.

Figure 5:
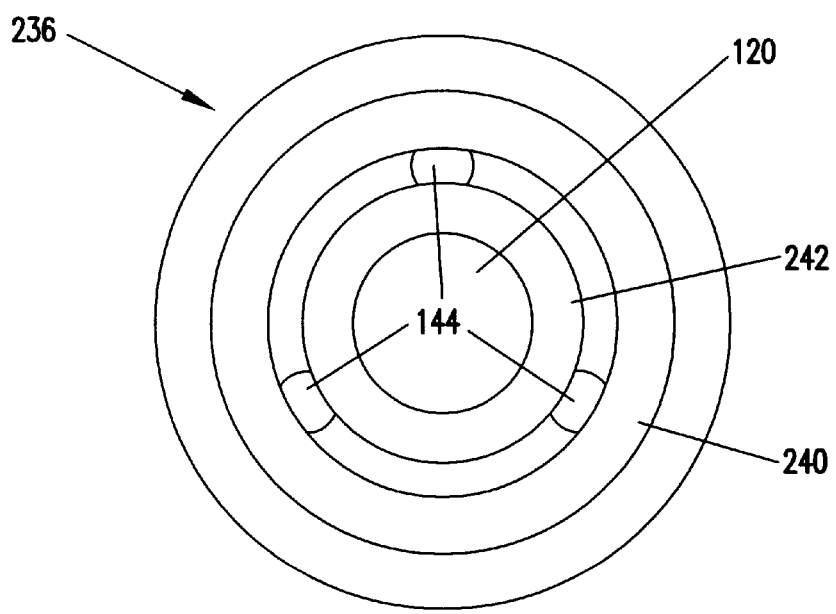
FIG. 5 is a plan view of a bearing in a pivot mechanism constructed in accordance with the present invention.

Another solution is to provide a minimal number of three balls 144 equally spaced between the inner race and the outer race 140, 142 and 146, 148. FIG. 5 illustrates a bearing assembly 236 constructed in accordance with the present invention. It will be noted that like the bearing assembly 136 of FIG. 4 the bearing assembly 236 has an inner race 242 supported by the pivot shaft 120. An outer race 240 circumscribes the inner race 242, the difference lying in there being only three balls 144 equally spaced therebetween. In this manner, differences in the size of the balls 144 are compensated by, in effect, a self-centering of the outer race 240 about the inner race 242 under a relatively low pre-load force. The use of only three balls 144 ensures that each of the balls 144 makes contact at a minimal preload force. The minimal preload force furthermore provides a minimal distortion in the balls 144 and in the races 240, 242, and minimal friction between the balls 144 and the races 240, 242.

Figure 6:
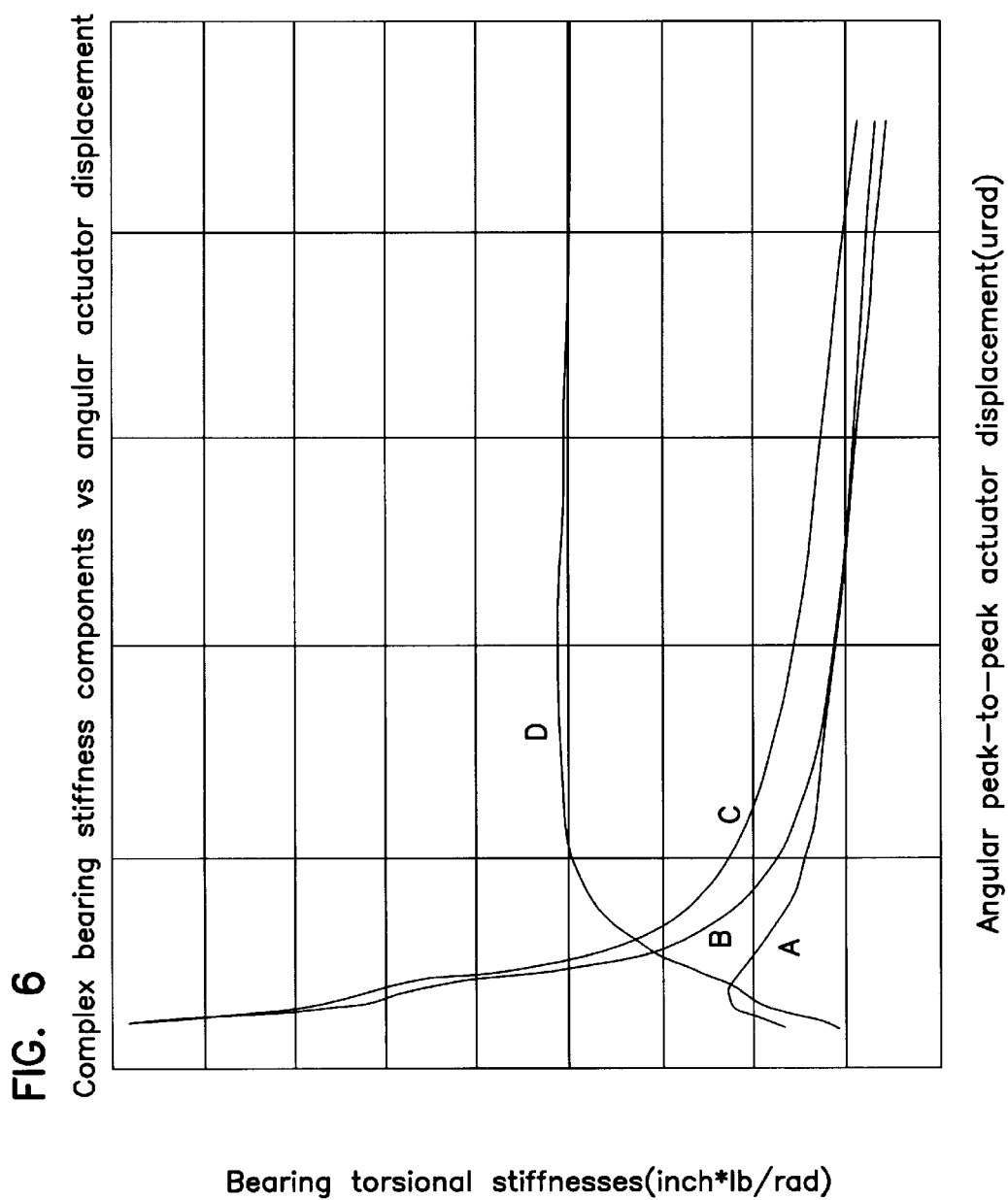
FIG. 6 is a graphical representation of the complex bearing stiffness components of a pivot mechanism for a disc drive actuator as a function of peak-to-peak actuator displacement.

So while hysteresis is directly proportional to the number of balls 144 and the subsequently necessary pre-load force, minimizing the number of balls 144 only serves to reduce the orders of magnitude that the effect of displacement has on hysteresis. That is, even by minimizing the number of balls 144, the hysteresis still remains the primary concern in evaluating the dynamic inertial response of the E-block 118 of an actuator assembly. Hysteresis can mathematically be characterized as a complex stiffness having real and imaginary constituents and dependent solely on the peak-to-peak magnitude of the displacement. One skilled in the art will recognize FIG. 6 illustrates the bearing stiffness components, from which it will be noted that the significantly increased hysterectic effect of small displacements can functionally limit the smallest arc over which an actuator can reliably be moved. This has an adverse affect on the track following capability of the actuator.

Figure 7:
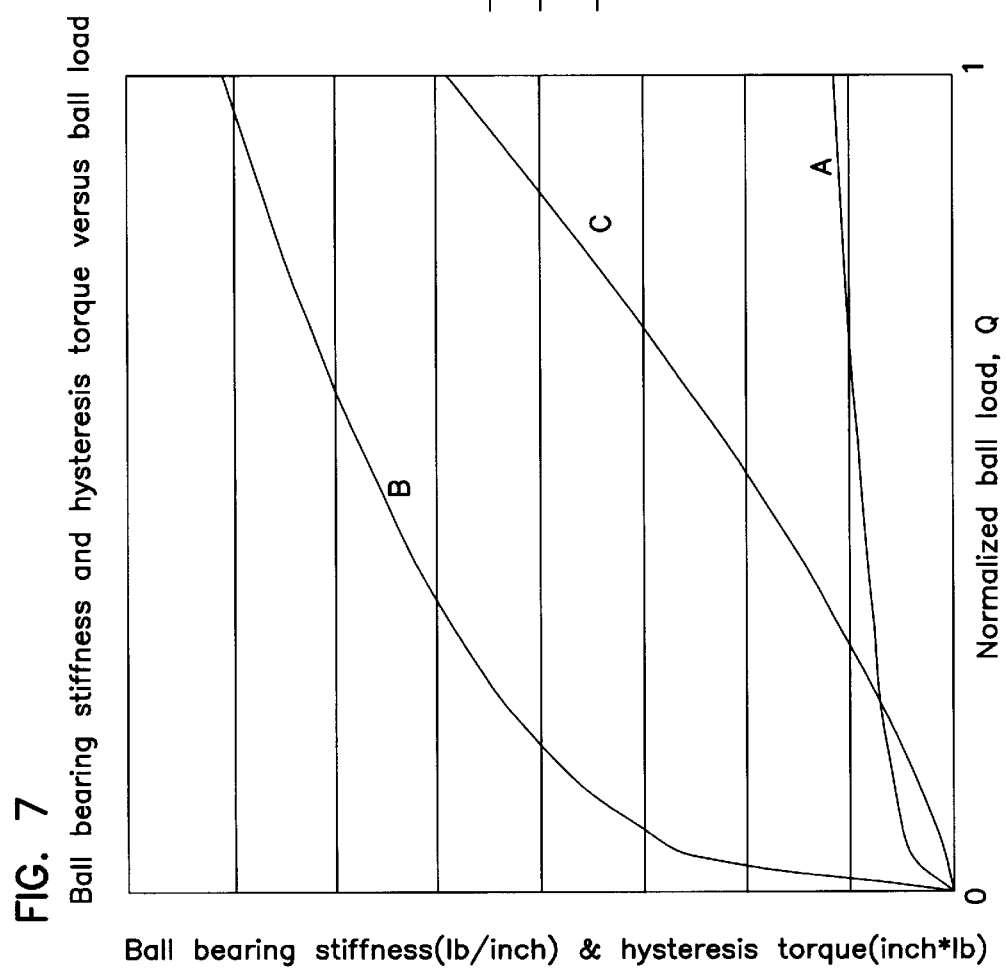
FIG. 7 is a graphical representation showing the relationship of bearing axial and radial stiffness and hysteresis to individual ball load, Q.

FIG. 7 is a typical graphical representation showing the relationship of bearing axial and radial stiffness and hysteresis to individual ball load, Q. Generally, the stiffness and hysteresis are directly related to the ball load. It will be noted that at relatively low ball loads there is a minimal hysterectic effect in the presence of a relatively high available axial and radial stiffness (approximately 50% of maximum values). It is within this region that the present invention achieves the advantages of using a relatively low ball load force, and, therefore, low hysteresis, while still maintaining adequate axial and radial stiffness necessary for the structural integrity of the actuator.

Figure 8:
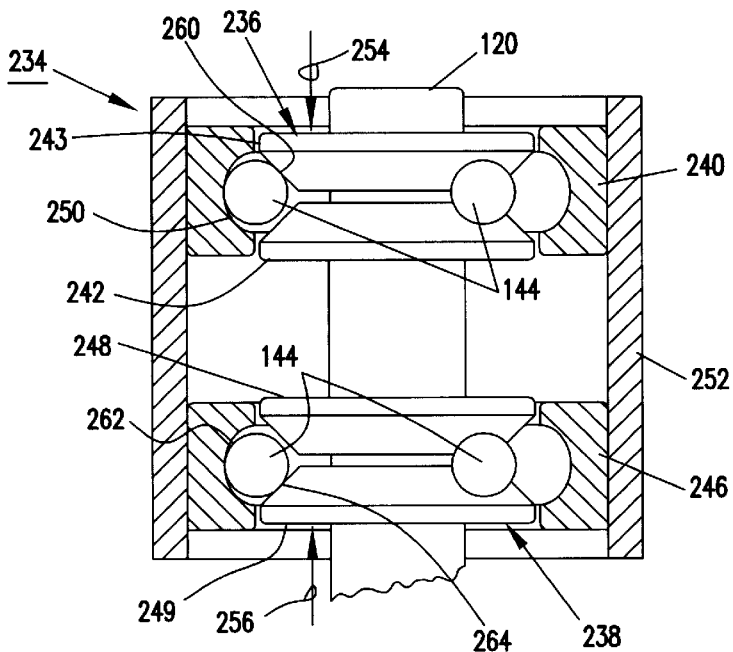
FIG. 8 is a partial sectional elevation view of a pivot mechanism for a disc drive actuator made in accordance with a preferred embodiment of the present invention.

Turning now to FIG. 8 which shows a bearing cartridge 234 made in accordance with a preferred embodiment of the present invention. It will be noted that bearing assemblies 236, 238 are supported by the pivot shaft 120 and support, in turn, the sleeve 252. The bearing assemblies 236, 238 generally have two-piece inner races, split axially in order to facilitate the assembly of the balls 144 between the outer race 240 and the inner race. The first bearing assembly 236 thus has inner race members 242, 243; similarly, the second bearing assembly 238 has inner race members 248, 249. It will be noted the inner races 242, 243 form a conical bearing surface.

In assembling the bearing cartridge of FIG. 8, the first outer race 240 may be first attached to the sleeve 252, and the first inner race 243 attached to the pivot shaft 120. The balls 144 are then positioned in place and the first inner race 242 is attached to retain the balls 144 in place. The second outer race 246 may then be attached to the sleeve 252, and the second inner race 248 attached to the pivot shaft 120. The balls 144 may then be positioned in place and the second inner race 249 positioned but not attached to the pivot shaft. By supporting the first inner race 243 with a force in a direction denoted by arrow 254 and applying an opposing force to the second inner race 249 in a direction denoted by arrow 256, a "diamond" preload arrangement is provided as shown in FIG. 8.

It will be noted that in the "diamond" arrangement of FIG. 8 only the first inner race 243 and the second inner race 249 operably engage the balls 144. The outer races 240, 246 have characteristic surfaces with a radius of curvature preferably slightly larger than the radius of the ball 144. This provides for a two-point contact for each ball 144, with the first outer race 240 at contact point 258 and with the first inner race 243 at contact point 260. In a preferred embodiment the ball 144 contacts the races 240, 243 at a contact angle of 45 degrees. Similarly, there is a two-point, 45 degree contact for each ball 144, with the second outer race 246 at contact point 262 and with the second inner race 249 at contact point 264.

An understanding of the previous discussion reveals that the first inner race 242 and the second inner race 248 do not participate in the operation of the bearing cartridge 234, rather the first and second inner races 242, 248 facilitate the placement of the balls 144 during the assembly process. In another preferred embodiment shown in FIG. 9 they are replaced with a less expensive pair of retention discs 266 provided for temporary retention of the balls 144 until the preload force is applied.

Figure 9:
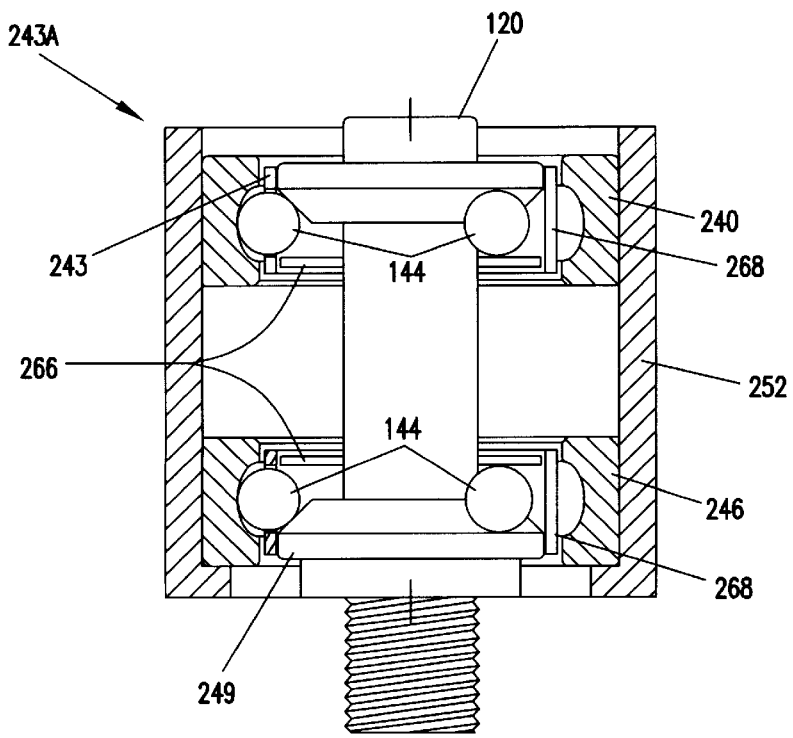
FIG. 9 is a partial sectional elevation view of a pivot mechanism for a disc drive actuator made in accordance with another preferred embodiment of the present invention.
Figure 10:
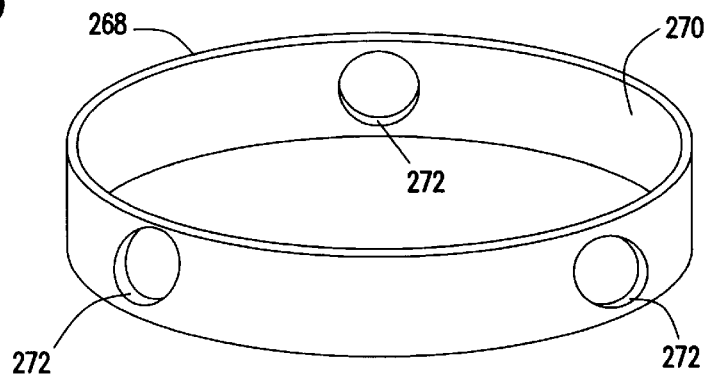
FIG. 10 is a perspective view of the ball cage of the pivot mechanism of FIG. 9.

FIG. 9 furthermore shows the use of a ball cage 268 within a gap between the inner races 243, 249 and the respective outer races 240, 246. The ball cage 268 limits the movement of the three balls 144 with respect to one another to maintain a substantially equidistant distribution of balls 144 about the pivot shaft 120. FIG. 10 shows a ball cage 268 constructed in accordance with a preferred embodiment of the present invention, having a cylindrical body 270 forming three openings 272 for receiving disposition of the balls 144. The openings 272 are formed slightly larger than the diameter of the balls 144 to allow free rotation therein.

Figure 11:
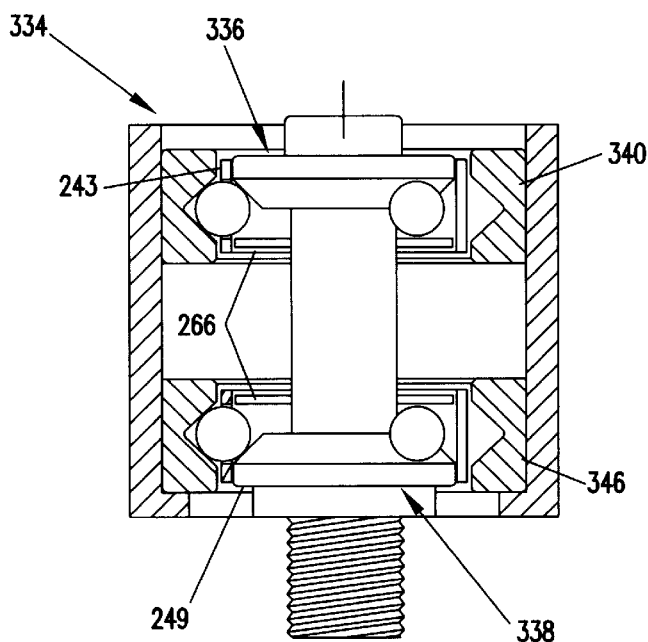
FIG. 11 is a partial sectional elevation view of a pivot mechanism for a disc drive actuator made in accordance with another preferred embodiment of the present invention.

FIG. 11 illustrates a bearing cartridge 334 constructed in accordance with another preferred embodiment of the present invention. It will be understood that bearing assemblies 336, 338 are provided and preloaded to provide a "diamond" arrangement. Like the bearing cartridge 234A of FIG. 9, the first bearing assembly 336 has the first inner race 243 and retention disc 266; the second bearing assembly 338 has the second inner race 249 and retention disc 266. The outer races 340, 346, however, have contact surfaces that are substantially parallel to the contact surfaces of the inner races 243, 249. This provides a more defined single-point contact between the balls 144 and the outer races 340, 346.

Figure 12:
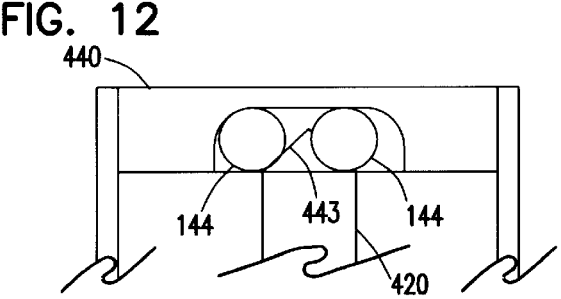
FIG. 12 is a sectional elevation view of the stationary shaft and first outer race of a pivot mechanism for a disc drive actuator made in accordance with another preferred embodiment of the present invention.
Figure 13:
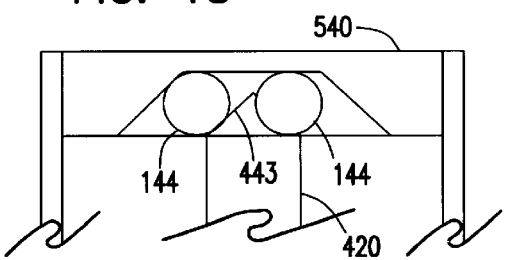
FIG. 13 is a sectional view of an alternative embodiment of the stationary shaft and first outer race of FIG. 12.

FIG. 12 illustrates yet another construction of a preferred embodiment of the present invention, wherein a pivot shaft 420 forms at a distal end thereof the inner race 443. A first outer race 440 has an arcuate surface for receivingly engaging the ball 144 in single-point contact therewith. The integral first inner race 443 may be used in conjunction with the second inner race 248 of FIG. 8 in an "X" preload arrangement. FIG. 13 illustrates another integral first inner race 443 in conjunction with a first outer race 540 having a contact surface that is parallel to the first inner race 443 contact surface.

The present invention provides an improved pivot mechanism for an E-block (such as 118) with reduced hysteretic response characteristics and thus an improved inertial response capability. The pivot mechanism has a pair of ball bearings (such as 136, 138) which support a sleeve (such as 152) about a pivot shaft (such as 120). The E-block is pivotally supported by attachment to the sleeve.

The ball bearings have a total of three balls (such as 144) rollingly interposed between an outer race (such as 140) and an inner race (such as 142), the three balls evenly circumferentially spaced about the pivot shaft and may be maintained substantially in even spacing by a ball cage (such as 268).

The three ball bearings allow a minimal preload to engage all the balls, which make a single-point contact on the inner and outer races. In a preferred embodiment the outer race has a contact surface with a radius of curvature slightly larger than the radius of the ball, and a conical inner race. In another preferred embodiment the outer race has a contact surface that is parallel to the contact surface of the opposing inner race. In yet another embodiment the pivot shaft forms a conical contact surface of the inner race, making inner race integral to the pivot shaft. In all cases, the preload is relatively small, to reduce hysteresis, yet sufficient to provide the necessary rigidity to the pivot mechanism in support of the E-block.

It is understood that even though numerous characteristics and advantages of various embodiments of the present invention have been set forth in the foregoing description, together with details of the structure and function of various embodiments of the invention, this disclosure is illustrative only, and changes may be made in detail especially in matters of structure and arrangement of parts within the principles of the present invention to the full extent indicated by the broad general meaning of the terms in which the appended claims are expressed.

What is claimed is:

1. A bearing cartridge for pivotally supporting a disc drive actuator about a pivot shaft to radially position a read/write head adjacent a selected data track of a data disc, the bearing cartridge comprising:

a first bearing supported by a distal end of the pivot shaft, comprising:
  a first plurality of balls consisting of a totality of three balls;
  a first inner race having a characteristic contact surface making single-point contact with the first plurality of balls;
  a first outer race circumscribing the first plurality of balls and having a characteristic contact surface making single-point contact with the first plurality of balls;

a second bearing supported by a proximal end of the pivot shaft, comprising:
  a second plurality of balls consisting of a totality of three balls;
  a second inner race having a characteristic contact surface making single-point contact with the second plurality of balls;
  a second outer race circumscribing the second plurality of balls and having a characteristic contact surface making single-point contact with the second plurality of balls; and a sleeve supported by the outer races of the ball bearings, wherein the sleeve supports the actuator.

2. The bearing cartridge of claim 1 wherein:
the first outer race contact surface has a radius of curvature that is at least equal to the radius of each of the first plurality of balls; and
the second outer race contact surface has a radius of curvature that is at least equal to the radius of each of the second plurality of balls.

3. The bearing cartridge of claim 1 wherein:
the first inner race contact surface is conical; and
the second inner race contact surface is conical.

4. The bearing cartridge of claim 3 wherein:
the first outer race contact surface is conical and parallel to the first inner race contact surface; and
the second outer race contact surface is conical and parallel to the second inner race contact surface.

5. The bearing cartridge of claim 4 wherein each ball engages the first outer race contact surface at contact angles of approximately 45 degrees.

6. The bearing cartridge of claim 4 wherein each ball engages the second outer race contact surface at contact angles of approximately 45 degrees.

7. The bearing cartridge of claim 6 further comprising a resilient seal outboard of the first bearing and the second bearing to prevent migration of particulates into and out of the bearings.

8. The bearing cartridge of claim 7 further comprising:
a first ball cage to limit the travel of the first plurality of balls so that the first plurality of balls remain approximately equidistant circumferentially with respect to each other; and
a second ball cage to limit the travel of the second plurality of balls so that the second plurality of balls remain approximately equidistant circumferentially with respect to each other.

9. The bearing cartridge of claim 8 wherein the ball cages comprise a cylindrical member forming a plurality of openings for receiving disposition of the balls.

10. A disc drive, comprising:
a data disc supporting a medium for reading and writing data;
a motor for spinning the data disc;
an actuator supporting a plurality of read/write heads for reading data from and writing data to the discs,
a pivot mechanism supporting the actuator for moving the read/write heads in data reading and writing relationship adjacent the discs, wherein the pivot mechanism comprises:
a pivot shaft;
a first bearing supported by a distal end of the pivot shaft, comprising:
  a first plurality of balls consisting of a totality of three balls;

a first inner race having a characteristic contact surface making single-point contact with the first plurality of balls;

a first outer race circumscribing the first plurality of balls and having a characteristic contact surface making single-point contact with the first plurality of balls;

a second bearing supported by a proximal end of the pivot shaft, comprising:

a second plurality of balls consisting of a totality of three balls;

a second inner race having a characteristic contact surface making single-point contact with the second plurality of balls;

a second outer race circumscribing the second plurality of balls and having a characteristic contact surface making single-point contact with the balls; and a sleeve supported by the outer races of the ball bearings, which, in turn, supports the actuator.

11. The bearing cartridge of claim 10 wherein:

the first outer race contact surface has a radius of curvature that is at least equal to the radius of the largest of the first plurality of balls; and the second outer race contact surface has a radius of curvature that is at least equal to the radius of the largest of the second plurality of balls.

12. The bearing cartridge of claim 10 wherein:

the first inner race contact surface is conical; and the second inner race contact surface is conical.

13. The bearing cartridge of claim 12 wherein:

the first outer race contact surface is conical and parallel to the first inner race contact surface; and the second outer race contact surface is conical and parallel to the second inner race contact surface.

14. The bearing cartridge of claim 13 wherein each ball engages the first outer race contact surface at contact angles of approximately 45 degrees.

15. The bearing cartridge of claim 13 wherein each ball engages the second outer race contact surface at contact angles of approximately 45 degrees.

16. The bearing cartridge of claim 15 further comprising a resilient seal outboard of the first bearing and the second bearing to prevent migration of particulates into and out of the ball bearings.

17. The bearing cartridge of claim 16 further comprising:

a first ball cage to limit the travel of the first plurality of balls so that the first plurality of balls remain approximately equidistant circumferentially with respect to each other;

a second ball cage to limit the travel of the second plurality of balls so that the second plurality of balls remain approximately equidistant circumferentially with respect to each other.

18. The bearing cartridge of claim 17 wherein each ball cage comprises a cylindrical member forming a plurality of openings for receiving disposition of the balls.

19. The bearing cartridge of claim 18 wherein the second inner race contact surface is formed as a portion of the stationary shaft.

20. A bearing cartridge for a disc drive, comprising:

an inner race;

an outer race; and means for interposing a plurality of balls between the inner race and outer race to minimize a hysteresis response of the bearing cartridge.

* * * * *